(12) United States Patent
Sugino

(10) Patent No.: US 8,133,145 B2
(45) Date of Patent: Mar. 13, 2012

(54) TRANSMISSION

(75) Inventor: Soichi Sugino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 12/711,656

(22) Filed: Feb. 24, 2010

(65) Prior Publication Data

US 2010/0227726 A1    Sep. 9, 2010

(30) Foreign Application Priority Data

Mar. 4, 2009   (JP) ................................ 2009-050521

(51) Int. Cl.
*F16H 37/02* (2006.01)
(52) U.S. Cl. ....................................... 475/207
(58) Field of Classification Search ........................ None
See application file for complete search history.

(56) References Cited

U.S. PATENT DOCUMENTS

| | | | | |
|---|---|---|---|---|
| 4,200,006 | A * | 4/1980 | Ehrlinger et al. | 475/219 |
| 4,924,729 | A * | 5/1990 | Sherman et al. | 475/207 |
| 5,554,079 | A * | 9/1996 | Seo et al. | 475/207 |
| 6,733,412 | B2 * | 5/2004 | Kumagai et al. | 475/218 |
| 6,893,373 | B2 * | 5/2005 | Kawamoto et al. | 475/302 |
| 7,344,471 | B2 * | 3/2008 | Sugino et al. | 475/318 |
| 7,833,120 | B2 * | 11/2010 | Yang | 475/209 |
| 7,896,770 | B2 * | 3/2011 | Earhart et al. | 475/218 |
| 2008/0161149 | A1 | 7/2008 | Diosi et al. | |

FOREIGN PATENT DOCUMENTS

| | | |
|---|---|---|
| JP | 54-60646 A | 5/1979 |
| JP | 11-51125 A | 2/1999 |
| JP | 2003-184965 A | 7/2003 |
| JP | 2004-100941 A | 4/2004 |
| JP | 2008-531954 A | 8/2008 |

OTHER PUBLICATIONS

Japanese Office Action dated Jan. 26, 2011, issued in corresponding Japanese Patent Application No. 2009-050521.

* cited by examiner

*Primary Examiner* — Dirk Wright
(74) *Attorney, Agent, or Firm* — Westerman, Hattori, Daniels & Adrian, LLP; William F. Westerman

(57) ABSTRACT

In a transmission including a multiple planetary mechanism into which power from a driving source is inputted through an input shaft, clutches are provided respectively for three components among a plurality of components included in the multiple planetary mechanism and are respectively disposed and capable of switching between connection and disconnection of transmission of power between the input shaft and the three components. Brakes are respectively provided between a transmission case and components among the plurality of components. The brakes are configured to make the components stationary relative to the transmission case. Two transmission mechanisms different from each other in speed reduction ratio are provided between an output shaft, which is parallel with the input shaft, and two components among the plurality of components. The two transmission mechanisms are provided in such a manner as to be capable of selectively switching transmission of the power to the output shaft side. Accordingly, it is possible to provide a transmission whose controllability of transmission is enhanced, and whose efficiency is improved by reducing the friction.

5 Claims, 4 Drawing Sheets

TRANSMISSION

BACKGROUND OF THE INVENTION

1. Field of the Invention

The present invention relates to a transmission including a multiple planetary mechanism into which power from a driving source is inputted through an input shaft.

2. Description of the Related Art

Published Japanese Translation No. 2008-531954 of PCT/EP2006/001937 has made known a transmission which achieves eight selectable forward gear ratios and a single reverse gear ratio by use of four planetary mechanisms and five engagement components. In addition, Japanese Patent Application Laid-open No. 11-51125 has made known a twin clutch transmission which achieves multiple speeds by use of a twin clutch.

In the transmission disclosed by Published Japanese Translation No. 2008-531954 of PCT/EP2006/001937, each engagement component is used for multiple transmission speeds. Because a torque intended to be transmitted varies depending on the transmission speeds, each engagement component needs to be designed corresponding to a transmission speed for transmitting the largest torque. This makes the transmission control difficult. To put it specifically, in some cases, it is necessary to control a small torque with a clutch having a large capacity, as if watering a flower garden with a fire pump. In addition, while idling, some engagement component may cause a large difference in rotation of the planetary mechanisms. This unnecessarily increases the friction between the planetary mechanisms. In the worst case, this causes troubles such as sticking in the transmission, thus resulting in deterioration in efficiency of the transmission.

Such a transmission as disclosed by Japanese Patent Application Laid-open No. 11-51125 is generally of a twin-counter type which uses two or more countershafts for the purpose of making shorter the overall length of the main shaft, namely the overall length of the transmission with consideration being given to the mounting of a transverse engine on a front-drive vehicle. In this case, the countershafts, which are installed under the main shaft and the differential shaft, rotate in oil. This increases the resistance to stirring and thus causes the deterioration of the transmission efficiency.

Further, in a case where a transmission having 8 or more transmission speeds is needed in view of a demand for improvement in fuel mileage, and the like, the number of gear trains should be increased. This makes longer the overall length of the main shaft, namely the overall length of the transmission. This elongation accordingly impairs the mountability of the transmission onto the vehicle. For this reason, it is difficult to achieve the transmission having a larger number of transmission speeds.

Further, in a case where a span of any shaft which is supported by a bearing is long, the shaft is apt to deform when heavily loaded, and the durability and the like is apt to be adversely affected. If the rigidity of the shaft is increased as countermeasures, the weight of the transmission conversely increases, and the fuel mileage accordingly decreases. For this reason, it is difficult to mount such a transmission on a vehicle which is expected to be driven with a heavy load such as the hauling of a trailer.

Furthermore, with regard to transmission control, the transmission disclosed by Japanese Patent Application Laid-open No. 11-51125 is not capable of smoothly changing transmission speeds one-by-one (from an odd-numbered speed to an even-numbered speed, or from an even-numbered speed to an odd-numbered speed) because of its structural characteristics. Moreover, when a driver unexpectedly shifts the transmission to a higher transmission gear or a lower transmission gear, the shift needs to be achieved by a preliminary shift in a high-speed mode. In addition, in order to secure a satisfactory response time for the gear shift, a synchronization mechanism with a larger capacity is needed. This increases friction.

SUMMARY OF THE INVENTION

The present invention has been made in view of such circumstances. An object of the present invention is to provide a transmission whose controllability of transmission is enhanced, and whose efficiency is improved by reducing the friction.

In order to achieve the object, according to a first feature of the present invention, there is provided a transmission including a multiple planetary mechanism into which power from a driving source is inputted through an input shaft, wherein clutches are provided respectively for three components among a plurality of components included in the multiple planetary mechanism and are respectively disposed and capable of switching between connection and disconnection of transmission of power between the input shaft and the three components, a brake is provided between a transmission case and one component among said plurality of components, the brake being configured to make said one component stationary relative to the transmission case, and two transmission mechanisms different from each other in speed reduction ratio are provided between an output shaft, which is parallel with the input shaft, and two components among said plurality of components, the two transmission mechanisms being provided in such a manner as to be capable of selectively switching transmission of the power to the output shaft side.

According to a second feature of the present invention, in addition to the first feature, the brake is provided between the transmission case and a component among said plurality of components which is different from the three components provided with the clutches between the input shaft and the respective three components.

According to a third feature of the present invention, in addition to the first or second feature, the two transmission mechanisms comprise gear trains, a driven gear included in that gear train whose gear ratio is lower than the other gear train is supported by the output shaft in such a manner as to be rotatable relative to the output shaft, a first connection switching mechanism configured to switch connection and disconnection between the driven gear and the output shaft is placed on the output shaft, a driving gear included in the other gear train whose gear ratio is higher is supported by a transmission shaft in such a manner as to be rotatable relative to the transmission shaft, the transmission shaft being linked with one of said two components among said plurality of components and placed coaxially with the input shaft, and a second connection switching mechanism configured to switch connection and disconnection of the driving gear and the transmission shaft is placed on the transmission shaft.

According to a fourth feature of the present invention, in addition to any of the first to third features, the two transmission mechanisms are placed between one of the three clutches and the multiple planetary mechanism.

According to a fifth feature of the present invention, in addition to the fourth feature, a first reverse idle gear is in mesh with the driving gear included in one of the two transmission mechanisms which comprise the gear trains, the first reverse idle gear being capable of being switched between a state in which the first reverse idle gear is rotatable relative to an auxiliary shaft capable of rotating about an axis in parallel with the input shaft and a state in which the first reverse idle gear is rotatable together with the auxiliary shaft, and a second reverse idle gear fixed to the auxiliary shaft is in mesh with the driving gear included in the other of the two transmission mechanisms.

Here, a second driven gear 21 of embodiments corresponds to the driven gear of the present invention; a third driving gear 23 of the embodiments corresponds to the driving gear of the present invention; first and second dog clutches D1 and D2 of the embodiments correspond to the first and second connection switching mechanisms; an engine E of the embodiments corresponds to a driving source of the present invention; and a carrier CA, a large ring gear LR, a large sun gear LS, a small ring gear SR, and a small sun gear SS of the embodiments correspond to the components of the multiple planetary mechanism of the present invention.

The foregoing configuration according to the present invention enables the following operations to be achieved. The rotary power from the input shaft can be outputted from one of the two components among the multiple components included in the multiple planetary mechanism with the rotary power being changed: by switching the transmission of the power between connection and disconnection in each of the clutches installed between the input shaft and the respective three components among the multiple components included in the multiple planetary mechanism; and by switching each of the brakes between the braking and non-braking states, the brakes installed between the transmission case and the components among the multiple components included in the multiple planetary mechanism. In addition, the power outputted from the multiple planetary mechanism can be transmitted to the output shaft with the power being further changed by selectively switching the transmission of the power to the output shaft by the two transmission mechanisms which are installed between the two components and the output shaft. Accordingly, it is possible to: achieve multiple transmission speeds with appropriate gear ratios and step ratios being obtained; enhance the controllability of the transmission by setting small and adequate necessary capacities for the clutches; and improve the efficiency by reducing friction.

The above description, other objects, characteristics and advantages of the present invention will be clear from detailed descriptions which will be provided for the preferred embodiment referring to the attached drawings.

DESCRIPTION OF THE PREFERRED EMBODIMENT

Figure 1:
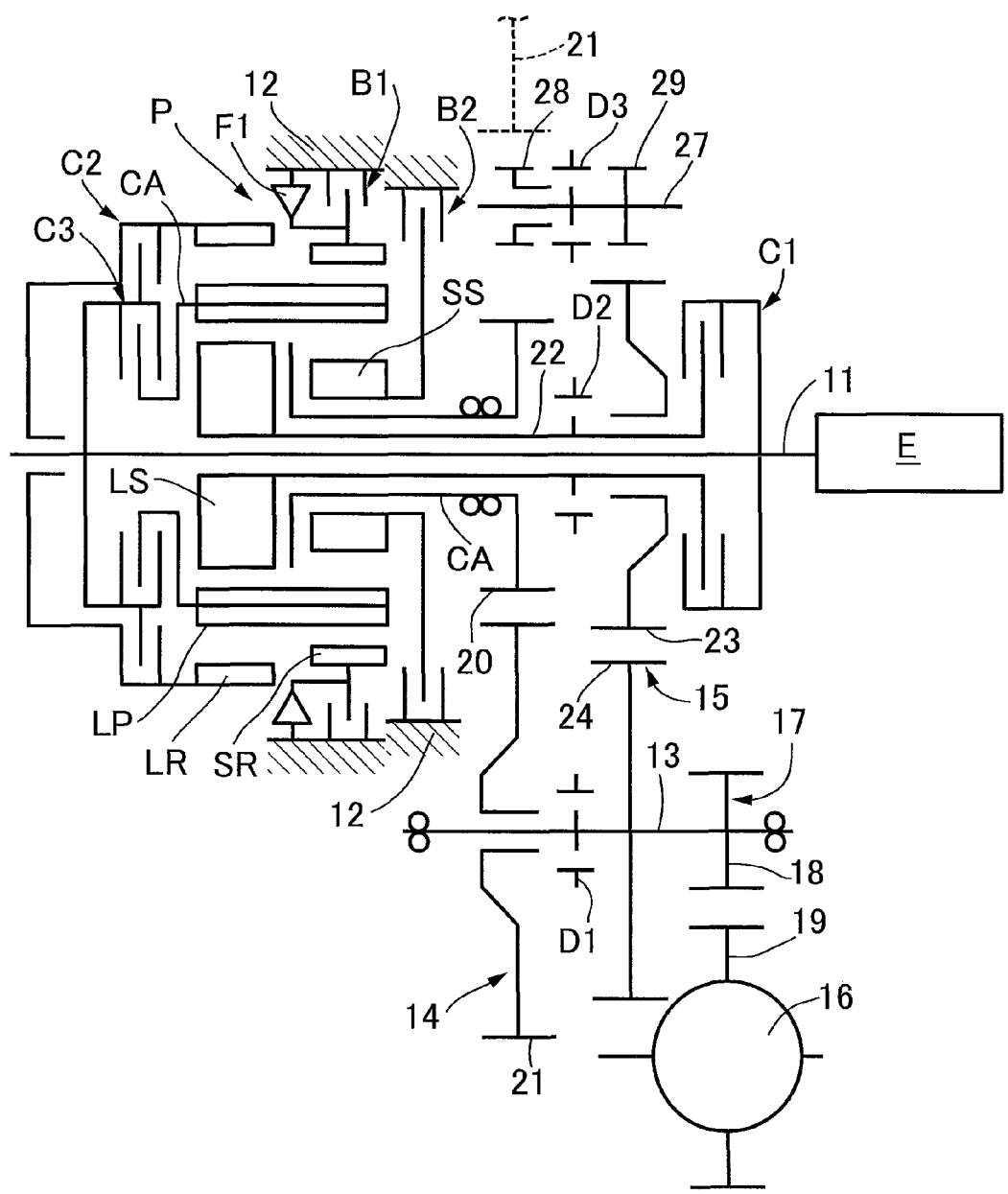
FIG. 1 is a skeleton diagram schematically showing a transmission.

Referring to the attached drawings, descriptions will be hereinafter provided for an embodiment of the present invention.

Embodiment 1

Referring to FIGS. 1 to 4, descriptions will be provided for a first embodiment of the present invention. First of all, in FIG. 1, this transmission includes: a multiple planetary mechanism P; first, second and third clutches C1, C2, C3; first and second brakes B1, B2; and two transmission mechanisms 14, 15. The multiple planetary mechanism P is configured to receive power from an engine E as a driving source through an input shaft 11. The first, second and third clutches C1, C2, C3 are provided to three components of the multiple planetary mechanism P, respectively, in a way that the first, second and third clutches C1, C2, C3 are capable of disconnecting and connecting the power transmission between the three components and the input shaft 11. The first and second brakes B1, B2 are provided between any one of the components of the multiple planetary mechanism P and a transmission case 12. The transmission mechanisms 14, 15 are provided between two of the multiple components included in the multiple planetary mechanism P and an output shaft 13 in a way that their speed reduction ratios are different from each other. The output shaft 13 is placed in a way that the output shaft 13 has an axis which is in parallel with the input shaft 11. The output shaft 13 is linked to a differential apparatus 16 with a gear train 17 being interposed in between. The gear train 17 includes: a first driving gear 18 provided to the output shaft 13; and a first driven gear 19 in mesh with the first driving gear 18.

Figure 2:
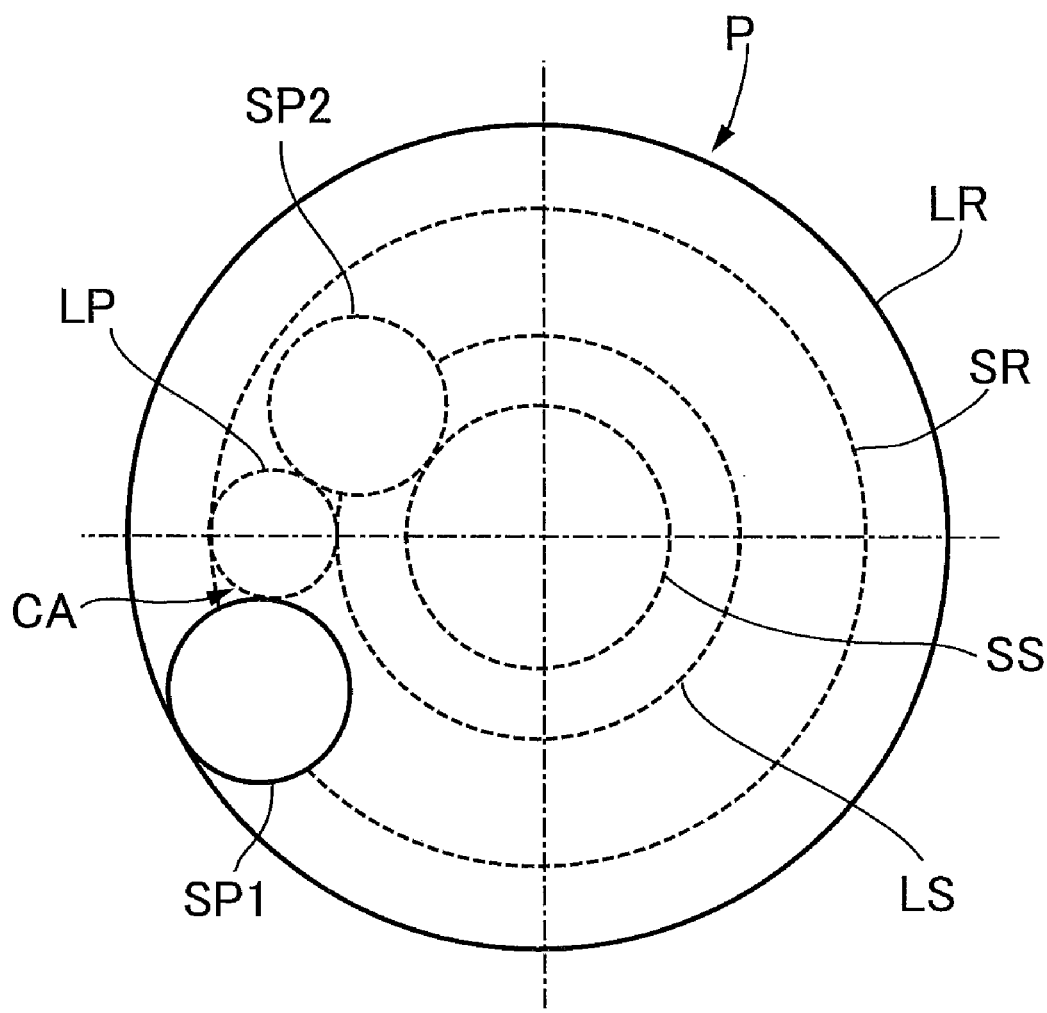
FIG. 2 is a diagram showing a configuration of a planetary mechanism.

In FIG. 2, the multiple planetary mechanism P includes 5 components. The 5 components include a four-component Ravigneaux type multiple planetary mechanism which is illustrated by broken lines; and a large ring gear LR and a first short pinion SP1 which are illustrated by solid lines. In other words, the multiple planetary mechanism P is a 5-component multiple planetary mechanism including, as the components, a large sun gear LS, a small sun gear SS, the large ring gear LR, a small ring gear SR, and a carrier CA which are placed coaxially with the input shaft 11. The carrier CA pivotally supports a first short pinion SP1, a second short pinion SP2 and a long pinion LP. The first short pinion SP1 is in mesh with the large ring gear LR. The second short pinion SP2 is in mesh with the small sun gear SS. The long pinion LP is in mesh with the large sun gear LS and the small ring gear SR, and in mesh with the first and second short pinions SP1, SP2. The first and second short pinions SP1, SP2 are omitted from FIG. 1 for the sake of simplification.

With regard to the large sun gear LS, the large ring gear LR, and the carrier CA which are among the 5 components included in the multiple planetary mechanism P, the first clutch C1 is installed between the large sun gear LS and the input shaft 11; the second clutch C2 is installed between the large ring gear LR and the input shaft 11; and the third clutch C3 is installed between the carrier CA and the input shaft 11. In addition, the first brake B1 is installed between the small ring gear SR and the transmission case 12; and the second brake B2 is installed between the small sun gear SS and the transmission case 12. In this respect, the small ring gear SR and the small sun gear SS are the remaining components among the multiple components included in the multiple planetary mechanism P, and are different from the three components LS, LR and CA; and the first to third clutches C1, C2, C3 are installed between the input shaft 11 and the respective three components LS, LR, CA. A one-way clutch F1 is installed between the small ring gear SR and the transmission case 12 in such a manner as to be parallel with the first brake B1.

Figure 3:
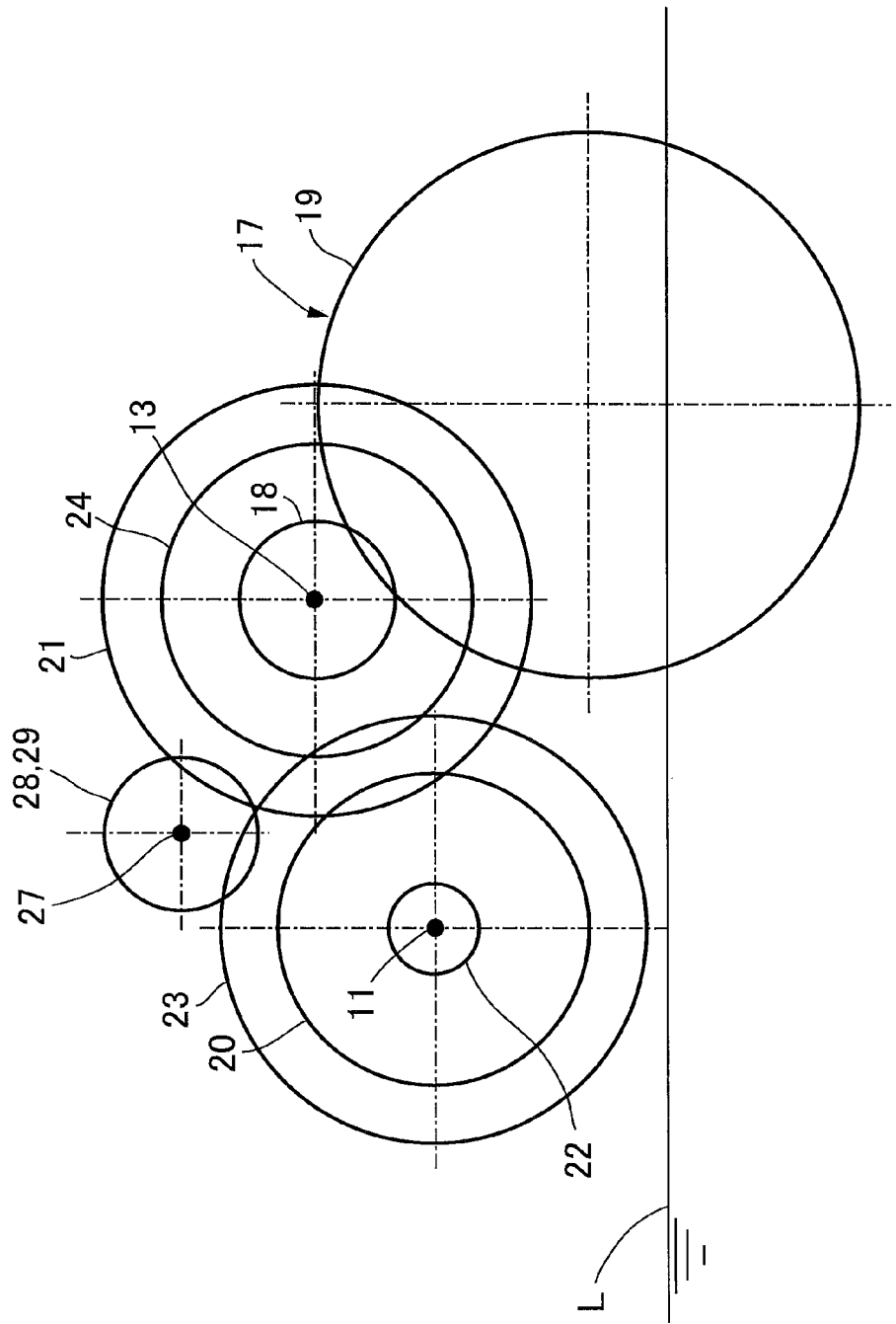
FIG. 3 is a diagram showing a shaft arrangement of a transmission mechanism.

Referring to FIG. 3 together, the transmission mechanisms 14, 15 comprise gear trains. The transmission mechanism 14 comprises a gear train with a lower gear ratio. The transmission mechanism 14 includes a second driving gear 20 and a second driven gear 21. The second driving gear 20 is installed in the carrier CA integrally. The second driven gear 21 is in mesh with the second driving gear 20, and is supported by the output shaft 13 in such a manner as to be rotatable relative to the output shaft 13. The transmission mechanism 15 comprises a gear train with a higher gear ratio. The transmission mechanism 15 includes a third driving gear 23 and a third driven gear 24. The third driving gear 23 is supported by a transmission shaft 22 in such a manner as to be rotatable relative to the transmission shaft 22. The transmission shaft 22 is linked to the large sun gear LS which is one of the components of the multiple planetary mechanism P, and is placed coaxially with the input shaft 11. The third driven gear 24 is in mesh with the third driving gear 23, and is installed fixed to the output shaft 13.

The two transmission mechanisms 14, 15 are selectively switched to transmit power to the output shaft 13. The connection and disconnection of the second driven gear 21 included in the transmission mechanism 14 to the output shaft 13 is switched by a first dog clutch D1 which is a first connection switching mechanism. The first dog clutch D1 is placed on the output shaft 13. The connection and disconnection of the third driving gear 23 included in the transmission mechanism 15 to the transmission shaft 22 is switched by a second dog clutch D2 which is a second connection switching mechanism. The second dog clutch D2 is placed on the transmission shaft 22.

Furthermore, the transmission mechanisms 14, 15 are placed between the multiple planetary mechanism P and the first clutch C1 which is among the first, second and third clutches C1, C2, C3 installed between the input shaft 11 and the respective three components of the multiple planetary mechanism P.

Incidentally, the input shaft 11, the transmission shaft 22, the output shaft 13 and the differential apparatus 16 are placed in a way that a lower portion of the differential apparatus 16 is located below an oil surface L of a lubricant oil reserved in the transmission case 12. The input shaft 11, the transmission shaft 22 and the output shaft 13 are placed in a way that the transmission mechanisms 14, 15 are located above the oil surface L. The gear train 17 between the output shaft 13 and the differential apparatus 16 as well as the transmission mechanisms 14, 15 are placed above the oil surface L so that the gear train 17 and the transmission mechanisms 14, 15 should not agitate the lubricant. These placements avoid increase in resistance which stems from the agitation, and helps to increase the transmission efficiency.

An auxiliary shaft 27 is placed between the output shaft 13 and a group of the input shaft 11 and the transmission shaft 22, and is located above the input shaft 11, the transmission shaft 22 and the output shaft 13 so as to be located above the oil surface L. The auxiliary shaft 27 is capable of rotating around an axis in parallel with the input shaft 11. As shown in FIG. 1, a first reverse idle gear 28 is supported by the auxiliary shaft 27 in such a manner as to be rotatable relative to the auxiliary shaft 27. A second reverse idle gear 29 is fixed to the auxiliary shaft 27. A third dog clutch D3 is installed above the auxiliary shaft 27. The third dog clutch D3 is configured to perform switching between two states: a state in which the first reverse idle gear 28 is rotatable relative to the auxiliary shaft 27 and a state in which the first reverse idle gear 28 is rotatable together with the auxiliary shaft 27.

The first reverse idle gear 28 is in mesh with the second driven gear 21 included in the transmission mechanism 14, which is a driven gear included in one of the two transmission mechanisms 14, 15. The second reverse idle gear 29 is in mesh with the third driving gear 23 included in the transmission mechanism 15, which is a driven gear included in the other of the two transmission mechanisms 14, 15.

Accordingly, when in a reverse mode, the second driven gear 21 included in the transmission mechanism 14 is rotatable relative to the output shaft 13, the third driving gear 23 included in the transmission mechanism 15 is rotatable relative to the transmission shaft 22, and the third dog clutch D3 fixes the first reverse idle gear 28 to the auxiliary shaft 27. Thus, a rotary power is outputted from the carrier CA included in the multiple planetary mechanism P. Thereby, a rotary torque is transmitted from the carrier CA to the output shaft 13 through the second driving gear 20, the second driven gear 21, the first reverse idle gear 28, the auxiliary shaft 27, the second reverse idle gear 29, the third drive gear 23 and the third driven gear 24.

Figure 4:
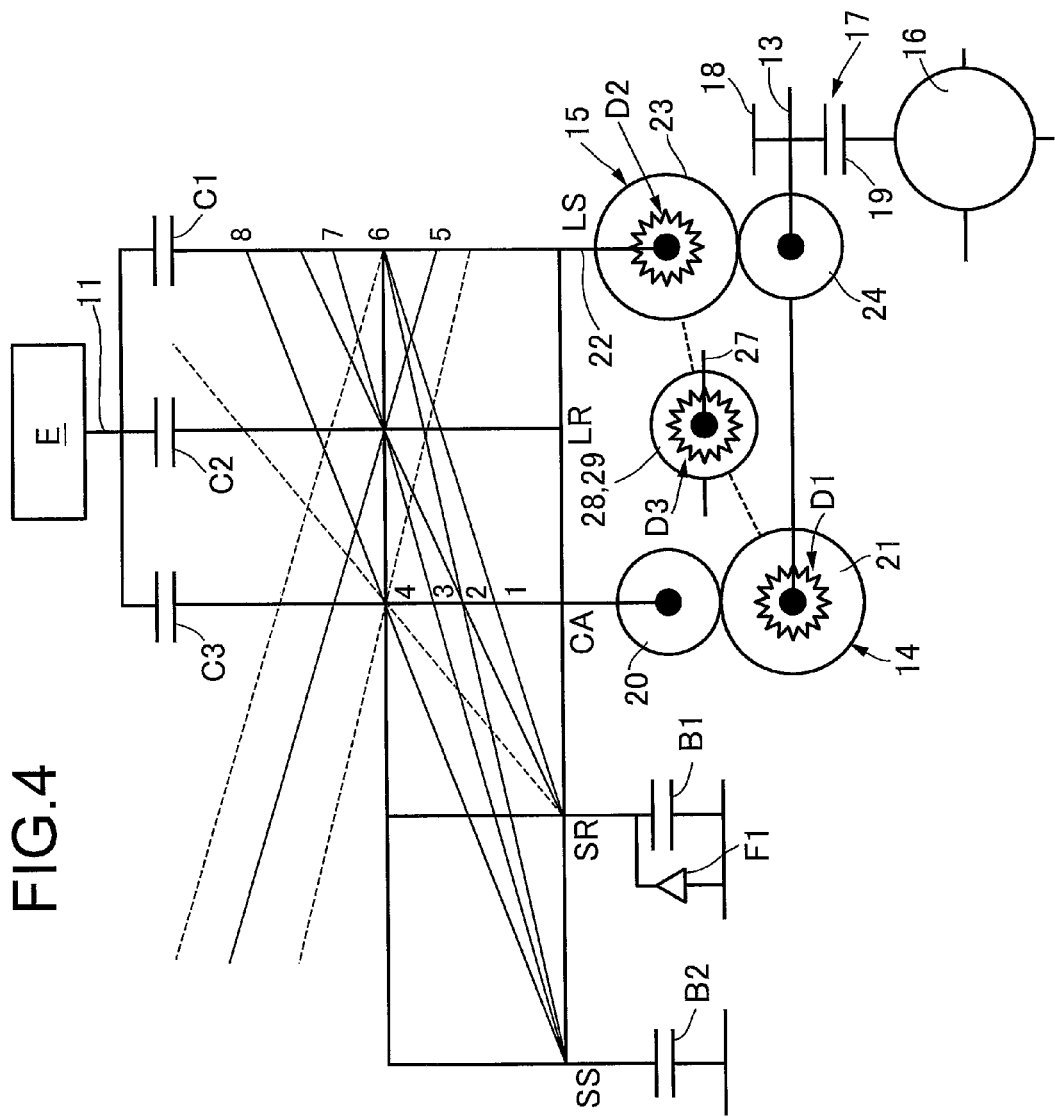
FIG. 4 is a speed diagram.

A vehicle can be driven with such a transmission by shifting 8 forward transmission steps and a single reverse transmission step when the first to third clutches C1, C2, C3, the first and second brakes B1, B2, and the first to third dog clutches D1, D2, D3 included in the transmission are set in operation as shown in Table 1. A speed diagram for the forward transmission steps is shown in FIG. 4. In this respect, ● (a black circle) in Table 1 indicates that the clutches, brakes and dog clutches are set in operation. In Table 1. when the one-way clutch F1 is marked with ●, it is shown that the rotation of the small ring gear SR is arrested. (●) (a black circle in parentheses) indicates that a corresponding brake is set in operation while an engine brake is in operation. "Ratio" indicates an instance of a gear ratio of each gear range. "Step" shows an instance of step ratios. In addition, in FIG. 4, the lowermost horizontal solid line indicates that the speed is 0 (zero); the second lowermost horizontal solid line indicates a speed of rotation which is inputted into each of the large sun gear LS, the large ring gear LR and the carrier CA. Vertical lines in FIG. 4 respectively indicate the large sun gear LS, the large ring gear LR, the carrier CA, the small ring gear SR and the small sun gear SS of the planetary mechanism P from the right.

TABLE 1

| | C1 | C2 | C3 | F1 | B1 | B2 | D1 | D2 | D3 | Ratio | Step |
|---|---|---|---|---|---|---|---|---|---|---|---|
| R1 | ● | | | | ● | (●) | | | ● | 2.721 | 79% |
| 1 | ● | | | ● | (●) | | ● | | | 3.447 | 1.444 |
| 2 | | ● | | ● | (●) | | ● | | | 2.386 | 1.364 |
| 3 | | ● | | | | ● | ● | | | 1.750 | 1.320 |
| 4 | | | ● | | | | ● | | | 1.326 | 1.237 |
| 5 | | ● | | | | | ● | ● | | 1.072 | 1.310 |
| 6 | ● | | | | | | | ● | | 0.818 | 1.242 |
| 7 | | ● | | | | | | ● | | 0.659 | 1.320 |
| 8 | | | ● | | | | | ● | ● | 0.499 | 6.908 |

When in a reverse mode, the second and third clutches C2 and C3 are disconnected so as to transmit no power; the first and second brakes B1, B2 are set in a non-braking state; the first and second dog clutches D1, D2 are set in an non-operational state; the first clutch C1 is set in a power transmitting state; the third dog clutch D3 is set in operation; and the first reverse idle gear 28 is fixed to the auxiliary shaft 27. Thereby, in the multiple planetary mechanism P, the power from the input shaft 11 is transmitted to the large sun gear LS; the carrier CA, the large ring gear LR and the small sun gear SS become capable of rotating idly; and the rotation of the small ring gear SR is arrested by the one-way clutch F1. While in this condition, the carrier CA rotates due to the transmission of the power from the large sun gear LS, and a torque is thus transmitted from the carrier CA to the output shaft 13 through the second driving gear 20, the second driven gear 21, the first reverse idle gear 28, the auxiliary shaft 27, the second reverse idle gear 29, the third driving gear 23 and the third driven gear 24.

When the transmission is shifted to a first forward speed, the second and third clutches C2, C3 are disconnected so as to transmit no power; the first and second brakes B1, B2 are set in a non-braking state; the second and third dog clutches D2, D3 are set in a non-operational state; the first clutch C1 is set in a power transmitting state; the first dog clutch D1 is set in operation; and the second driven gear 21 is fixed to the output shaft 13. Thereby, in the multiple planetary mechanism P, the power from the input shaft 11 is transmitted to the large sun gear LS; the carrier CA, the large ring gear LR and the small sun gear SS become capable of rotating idly; and the rotation of the small ring gear SR is arrested by the one-way clutch F1. While in this condition, the carrier CA rotates due to the transmission of the power from the large sun gear LS, and a torque is thus transmitted from the carrier CA to the output shaft 13 through the transmission mechanism 14.

When the transmission is shifted to a second forward speed, the first and third clutches C1, C3 are disconnected so as to transmit no power; the first and second brakes B1, B2 are set in a non-braking state; the second and third dog clutches D2, D3 are set in a non-operational state; the second clutch C2 is set in a power transmitting state; the first dog clutch D1 is set in operation; and the second driven gear 21 is fixed to the output shaft 13. Thereby, in the multiple planetary mechanism P, the power from the input shaft 11 is transmitted to the large ring gear LR; the carrier CA, the large sun gear LS and the small sun gear SS become capable of rotating idly; and the rotation of the small ring gear SR is arrested by the one-way clutch F1. While in this condition, the carrier CA rotates due to the transmission of the power from the large ring gear LR, and a torque is thus transmitted from the carrier CA to the output shaft 13 through the transmission mechanism 14.

When the transmission is shifted to a third forward speed, the first and third clutches C1, C3 are disconnected so as to transmit no power; the first brake B1 is set in a non-braking state; the second and third dog clutches D2, D3 are set in a non-operational state; the second clutch C2 is set in a power transmitting state; the second brake B2 is set in an operational state; the first dog clutch D1 is set in operation; and the second driven gear 21 is fixed to the output shaft 13. Thereby, in the multiple planetary mechanism P, the power from the input shaft 11 is transmitted to the large ring gear LR; the carrier CA, the large sun gear LS and the small ring gear SR become capable of rotating idly; and the second brake B2 makes the small sun gear SS stationary relative to the transmission case 12. While in this condition, the carrier CA rotates due to the transmission of the power from the large ring gear LR, and a torque is thus transmitted from the carrier CA to the output shaft 13 through the transmission mechanism 14.

When the transmission is shifted to a fourth forward speed, the first and second clutches C1, C2 are disconnected so as to transmit no power; the first and second brakes B1, B2 are set in a non-braking state; the second and third dog clutches D2, D3 are set in a non-operational state; the third clutch C3 is set in a power transmitting state; the first dog clutch D1 is set in operation; and the second driven gear 21 is fixed to the output shaft 13. Thereby, in the multiple planetary mechanism P, the power from the input shaft 11 is transmitted to the carrier CA; the large sun gear LS, the small sun gear SS, the large ring gear LR, and the small ring gear SR become capable of rotating idly. While in this condition, a torque is transmitted from the carrier CA to the output shaft 13 through the transmission mechanism 14.

When the transmission is shifted to a fifth forward speed, the first and third clutches C1, C3 are disconnected so as to transmit no power; the first and second brakes B1, B2 are set in a non-braking state; the third dog clutch D3 is set in a non-operational state; the second clutch C2 is set in a power transmitting state; the first and second dog clutches D1, D2 are set in operation; the second driven gear 21 is fixed to the output shaft 13; and the third driving gear 23 is fixed to the transmission shaft 22. Thereby, in the multiple planetary mechanism P, the power from the input shaft 11 is transmitted to the large ring gear LR; the carrier CA, the large sun gear LS, the small sun gear SS, and the small ring gear SR become capable of rotating idly. While in this condition, the carrier CA and the large sun gear LS are driven to rotate in response to the rotation of the large ring gear LR, and a torque is thus transmitted to the output shaft 13 through the transmission mechanisms 14, 15.

When the transmission is shifted to a sixth forward speed, the second and third clutches C2, C3 are disconnected so as to transmit no power; the first and second brakes B1, B2 are set in a non-braking state; the first and third dog clutches D1, D3 are set in a non-operational state; the first clutch C1 is set in a power transmitting state; the second dog clutch D2 is set in operation; and the third driving gear 23 is fixed to the transmission shaft 22. Thereby, in the multiple planetary mechanism P, the power from the input shaft 11 is transmitted to the large sun gear LS; and the carrier CA, the small sun gear SS, the large ring gear LR, and the small ring gear SR become capable of rotating idly. While in this condition, a torque is transmitted from the large sun gear LS to the output shaft 13 through the transmission mechanism 15.

When the transmission is shifted to a seventh forward speed, the first and third clutches C1, C3 are disconnected so as to transmit no power; the first brake B1 is set in a non-braking state; the first and third dog clutches D1, D3 are set in a non-operational state; the second clutch C2 is set in a power transmitting state; the second brake B2 is set in an operational state; the second dog clutch D2 is set in operation; and the third driving gear 23 is fixed to the transmission shaft 22. Thereby, in the multiple planetary mechanism P, the power from the input shaft 11 is transmitted to the large ring gear LR; the carrier CA, the large sun gear LS and the small ring gear SR become capable of rotating idly; and the second brake B2 makes the small sun gear SS stationary relative to the transmission case 12. While in this condition, the large sun gear LS rotates due to the transmission of the power from the large ring gear LR, and a torque is thus transmitted from the large sun gear LS to the output shaft 13 through the transmission mechanism 15.

Furthermore, when the transmission is shifted to an eighth forward speed, the first and second clutches C1, C2 are disconnected so as to transmit no power; the first brake B1 is set in a non-braking state; the first and third dog clutches D1, D3 are set in a non-operational state; the third clutch C3 is set in a power transmitting state; the second brake B2 is set in an operational state; the second dog clutch D2 is set in operation; and the third driving gear 23 is fixed to the transmission shaft 22. Thereby, in the multiple planetary mechanism P, the power from the input shaft 11 is transmitted to the carrier CA; the large sun gear LS, the large ring gear LR and the small ring gear SR become capable of rotating idly; and the second brake B2 makes the small sun gear SS stationary relative to the transmission case 12. While in this condition, the large sun gear LS rotates due to the transmission of the power from the carrier CA, and a torque is thus transmitted from the large sun gear LS to the output shaft 13 through the transmission mechanism 15.

Next, descriptions will be provided for operations of the first embodiment. With regard to the large sun gear LS, the large ring gear LR and the carrier Ca which are three components included in the multiple planetary mechanism P, the first clutch C1 is installed between the large sun gear LS and the input shaft 11; the second clutch C2 is installed between the large ring gear LR and the input shaft 11; and the third clutch C3 is installed between the carrier CA and the input shaft 11. With regard to the small ring gear SR and the small sun gear SS which are the two other components included in the multiple planetary mechanism P, the first brake B1 is installed between the small ring gear SR and the transmission case 12; and the second brake B2 is installed between the small sun gear SS and the transmission case 12. With regard to the carrier CA and the large sun gear LS included in the multiple planetary mechanism P, the transmission mechanism 14 is installed between the carrier CA and the output shaft 13; and the transmission mechanism 15 is installed between the large sun gear LS and the output shaft 13. In this respect, the transmission mechanisms 14, 15 are different from each other in the speed reduction ratio. Furthermore, the transmission mechanisms 14, 15 are configured to be selectively switched to transmit the power to the output shaft 13 side. For these reasons, the rotary power from the input shaft 11 is capable of being outputted from one of the carrier CA and the large sun gear LS which are two components of the multiple planetary mechanism P with the rotary power being changed: by switching the transmission of the power between connection and disconnection in each of the first to third clutches C1 to C3; and by switching each of the first and second brakes between the braking and non-braking states. Moreover, the power outputted from the multiple planetary mechanism P is capable of being transmitted to the output shaft 13 with the power being further changed, when the transmission of the power to the output shaft 13 is selectively switched between the two transmission mechanisms of: the transmission mechanism 14 installed between the carrier CA and the output shaft 13; and the transmission mechanism 15 installed between the large sun gear LS and the output shaft 13. The foregoing schemes make it possible to: achieve multiple transmission speeds with appropriate gear ratios and step ratios being obtained; make the capacities of the first to third clutches C1 to C3 all as small as the input torque; enhance the controllability of the transmission by setting small and adequate necessary capacities for the respectively first to third clutches C1 to C3; and improve the efficiency by reducing friction.

When the fourth forward transmission speed is shifted to the sixth forward transmission speed, the power is transmitted from the input shaft 11 to the output shaft 13 through one of the first and second transmission mechanisms 14, 15 instead of through the multiple planetary mechanism P. This enhances the transmission efficiency.

The first and second dog clutches D1, D2 configured to switch the first and second transmission mechanisms 14, 15 so as to transmit the power to the output shaft 13 side are less often operated than their counterparts of the twin clutch-type transmission. This makes it possible to simplify the hydraulic control system and the control program for operating the dog clutches.

An embodiment of the present invention is explained above, but the present invention is not limited to the above-mentioned embodiment and may be modified in a variety of ways as long as the modifications do not depart from the gist of the present invention.

What is claimed is:

1. A transmission including a multiple planetary mechanism into which power from a driving source is inputted through an input shaft, wherein
   clutches are provided respectively for three components among a plurality of components included in the multiple planetary mechanism and are respectively disposed and capable of switching between connection and disconnection of transmission of power between the input shaft and the three components,
   a brake is provided between a transmission case and one component among said plurality of components, the brake being configured to make said one component stationary relative to the transmission case, and
   two transmission mechanisms different from each other in speed reduction ratio are provided between an output shaft, which is parallel with the input shaft, and two components among said plurality of components, the two transmission mechanisms being provided in such a manner as to be capable of selectively switching transmission of the power to the output shaft side.

2. The transmission according to claim 1, wherein the brake is provided between the transmission case and a component among said plurality of components which is different from the three components provided with the clutches between the input shaft and the respective three components.

3. The transmission according to claim 1, wherein
   the two transmission mechanisms comprise gear trains,
   a driven gear included in that gear train whose gear ratio is lower than the other gear train is supported by the output shaft in such a manner as to be rotatable relative to the output shaft,
   a first connection switching mechanism configured to switch connection and disconnection between the driven gear and the output shaft is placed on the output shaft,
   a driving gear included in the other gear train whose gear ratio is higher is supported by a transmission shaft in such a manner as to be rotatable relative to the transmission shaft, the transmission shaft being linked with one of said two components among said plurality of components and placed coaxially with the input shaft, and
   a second connection switching mechanism configured to switch connection and disconnection of the driving gear and the transmission shaft is placed on the transmission shaft.

4. The transmission according to claim 1, wherein the two transmission mechanisms are placed between one of the three clutches and the multiple planetary mechanism.

5. The transmission according to claim 4, wherein
   a first reverse idle gear is in mesh with the driving gear included in one of the two transmission mechanisms which comprise the gear trains, the first reverse idle gear being capable of being switched between a state in which the first reverse idle gear is rotatable relative to an auxiliary shaft capable of rotating about an axis in parallel with the input shaft and a state in which the first reverse idle gear is rotatable together with the auxiliary shaft, and
   a second reverse idle gear fixed to the auxiliary shaft is in mesh with the driving gear included in the other of the two transmission mechanisms.

* * * * *